O. BAGULA.
CULINARY UTENSIL.
APPLICATION FILED JUNE 30, 1908.
932,943.
Patented Aug. 31, 1909.
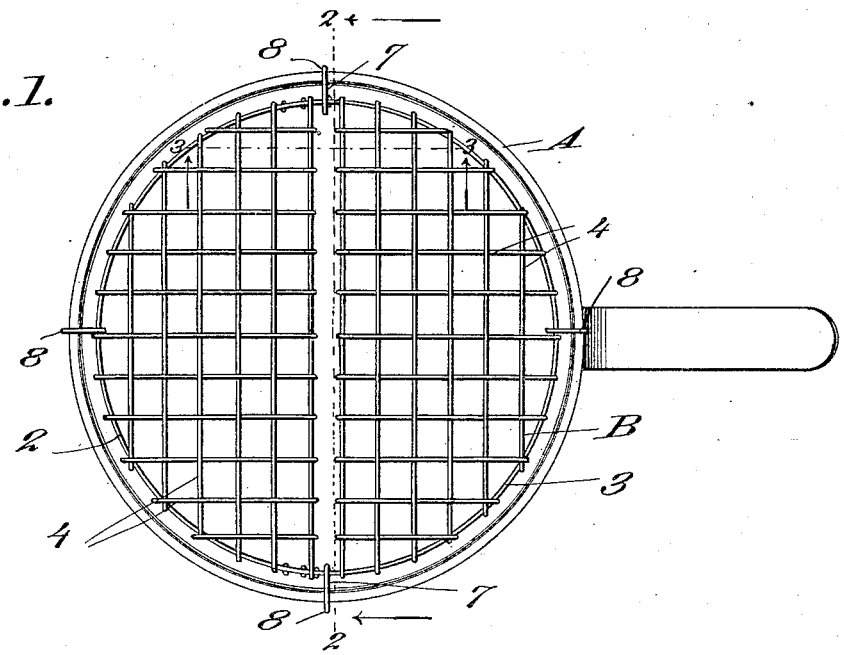
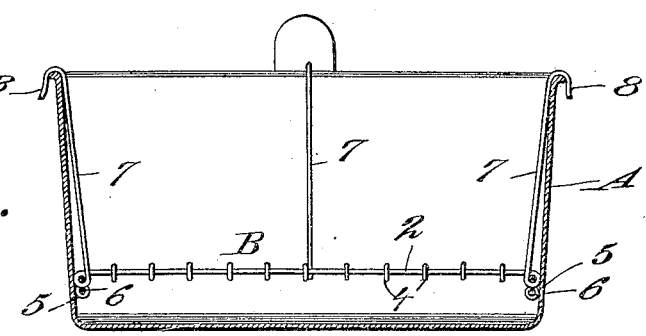
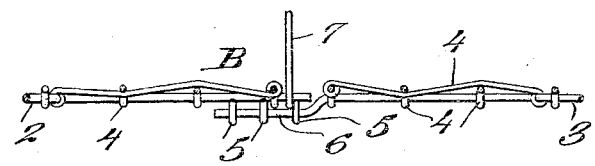
Witnesses
Phil E. Barnes,
John F. Byrne.
Inventor
Otto Bagula
By Victor J. Evans
Attorney

UNITED STATES PATENT OFFICE.

OTTO BAGULA, OF ST. LOUIS, MISSOURI.

CULINARY UTENSIL.

932,943.

Specification of Letters Patent. Patented Aug. 31, 1909.

Application filed June 30, 1908. Serial No. 441,063.

*To all whom it may concern:*

Be it known that I, OTTO BAGULA, a citizen of the United States of America, residing at St. Louis, State of Missouri, have invented new and useful Improvements in Culinary Utensils, of which the following is a specification.

My invention relates to improvements in culinary utensils, and its primary object is the provision of a device which is adapted for application to a cooking vessel to support the articles being cooked above the bottom thereof, whereby to prevent the burning of the articles.

A further object of my invention is the provision of a device of the character referred to above which is simple, durable and efficient, and which may be manufactured and sold at a comparatively low cost.

A still further object of my invention is the provision of a device of the character above referred to which can be adjusted to permit it to be applied to cooking vessels of different sizes.

With the above and other objects in view, the invention consists in the construction, combination and arrangement of parts hereinafter fully described, claimed and illustrated in the accompanying drawing, wherein:

Figure 1 is a top plan view illustrating the application of my improved device. Fig. 2 is a vertical sectional view taken on the plane indicated by the line 2—2 of Fig. 1 and Fig. 3 is a sectional view taken on the plane indicated by the line 3—3 of Fig. 1.

Referring to the drawing by reference characters, A designates a cooking vessel of the conventional type, and B my improved device which is adapted to be supported above the bottom of the vessel.

My improved device comprises semicircular sections which are constructed of any suitable reticulated material, and which are connected together for relative adjustments. As the device is constructed of reticulated material, water in the cooking vessel may freely circulate therethrough, and as the sections are adjustably connected together, the size of the device may be increased or decreased to adapt it for application to cooking vessels of different sizes. The sections of the vegetable supporting device consist of semicircular side bars 2 and 3 and straight body bars 4, which are assembled and connected together in a manner to provide semi-circular reticulated sections. The end of the side bar 2 projects beyond the straight edge of the section, and at its ends the bar is provided with a plurality of relatively spaced eyes or keepers 5. The ends of the side bar project beyond the straight edge of its section and are offset downwardly to provide bolt members 6, which are adapted to be adjustably received by the eyes 5 of the side bar 2. The connection between the sections of the vegetable supporting device is such that the size of the device may be increased or diminished to adapt it for application to vessels of different sizes. The vegetable supporting device is adapted to be suspended in a cooking vessel by means of arms 7. The arms are pivotally secured to the side bars of the sections of the vegetable supporting device and have their free ends formed to provide hooks 8 adapted to engage over the upper edge of the cooking vessel. Two of the arms 7 are secured to the projecting ends of the bar 2 and support the device at the point where the sections are united. One of the remaining arms 7 is secured to the bar 2 at a point centrally between the ends thereof and the remaining bar is secured to the bar 3 at a point centrally between the ends thereof.

It should be apparent from the above description taken in connection with the accompanying drawing, that I provide a device by means of which vegetables may be supported above the bottom of a cooking vessel to prevent their burning, that the device is simple, durable and efficient, and that it may be manufactured and sold at a comparatively low cost.

Changes in the form, proportions and minor details of construction may be made within the scope of the claim without departing from the spirit or sacrificing any of the advantages of the invention.

Having fully described and illustrated my invention, what I claim is:

A vegetable supporting device of the character set forth comprising semi-circular reticulated sections, each section including a semi-annular side bar, the ends of the side bar of one section extending beyond the straight edge of such section and offset downwardly to provide bolt members, the ends of the side bar of the other section extending beyond the straight edge of such section, a plurality of eyes secured to the side bar of the other section at a point adjacent the ends thereof, said eyes adjustably receiving the bolt members, a supporting arm pivotally securing each side bar at a point centrally between the ends thereof, and other supporting arms pivotally secured to the projecting ends of the side bars of said other section.

In testimony whereof I affix my signature in presence of two witnesses.

OTTO BAGULA.

Witnesses:
 Rosa Ross,
 C. L. Carson.